United States Patent
Lawn et al.

(10) Patent No.: US 10,203,241 B2
(45) Date of Patent: Feb. 12, 2019

(54) SLOW SPEED WEIGH-IN-MOTION SYSTEM WITH FLEXURE

(71) Applicant: Rinstrum Pty. Ltd., Acacia Ridge Qld. (AU)

(72) Inventors: John Lawn, Manilus, NY (US); Darren J. Pearson, Brisbane (AU); David McKinley, Sydney (AU); Bradley E. Fryburger, Noble, IL (US)

(73) Assignee: Rinstrum Pty. Ltd., Acacia Ridge Qld. (AU)

( * ) Notice: Subject to any disclaimer, the term of this patent is extended or adjusted under 35 U.S.C. 154(b) by 192 days.

(21) Appl. No.: 15/295,135

(22) Filed: Oct. 17, 2016

(65) Prior Publication Data

US 2017/0030764 A1 Feb. 2, 2017

Related U.S. Application Data

(63) Continuation-in-part of application No. 14/176,190, filed on Feb. 10, 2014, now Pat. No. 9,470,574.

(51) Int. Cl.
*G01G 19/02* (2006.01)
*G01G 21/23* (2006.01)

(52) U.S. Cl.
CPC ........... *G01G 21/23* (2013.01); *G01G 19/021* (2013.01); *Y10T 29/49002* (2015.01)

(58) Field of Classification Search
CPC . G01G 21/23; G01G 19/021; Y10T 29/49002
See application file for complete search history.

(56) References Cited

U.S. PATENT DOCUMENTS

| | | | | |
|---|---|---|---|---|
| 3,966,001 A | * | 6/1976 | Goldberg | G01G 1/24 177/128 |
| 4,066,140 A | * | 1/1978 | Conley | G01G 19/021 177/134 |
| 4,280,576 A | | 7/1981 | Smith, Jr. | |
| 4,475,610 A | | 10/1984 | Schwarzschild | |
| 4,828,055 A | * | 5/1989 | Hamilton | G01G 19/021 177/134 |
| 5,446,248 A | * | 8/1995 | Strasser | G01G 19/021 16/234 |
| 6,706,976 B1 | * | 3/2004 | Schuler | G01G 19/02 177/126 |
| 8,461,466 B2 | * | 6/2013 | Sagarsee | G01G 19/02 177/126 |
| 9,012,792 B2 | | 4/2015 | Gui | |
| 2014/0014415 A1 | * | 1/2014 | Stovern | G01G 19/02 177/133 |

* cited by examiner

*Primary Examiner* — Randy Gibson
(74) *Attorney, Agent, or Firm* — Maginot, Moore & Beck LLP

(57) ABSTRACT

In one embodiment, a weighing system includes a base, a platform structure movable with respect to the base, at least one flexure fixedly attached to the platform and the base, the at least one flexure configured to inhibit movement of the platform structure along a horizontal plane relative to the base, and a plurality of load cell assemblies, each of the plurality of load cell assemblies including an upper portion pivotably supported by the base through a first pivot assembly and a lower portion pivotably supporting the platform structure through a second pivot assembly, wherein an axis of rotation of the first pivot assembly is parallel to an axis of rotation of the second pivot assembly.

18 Claims, 14 Drawing Sheets

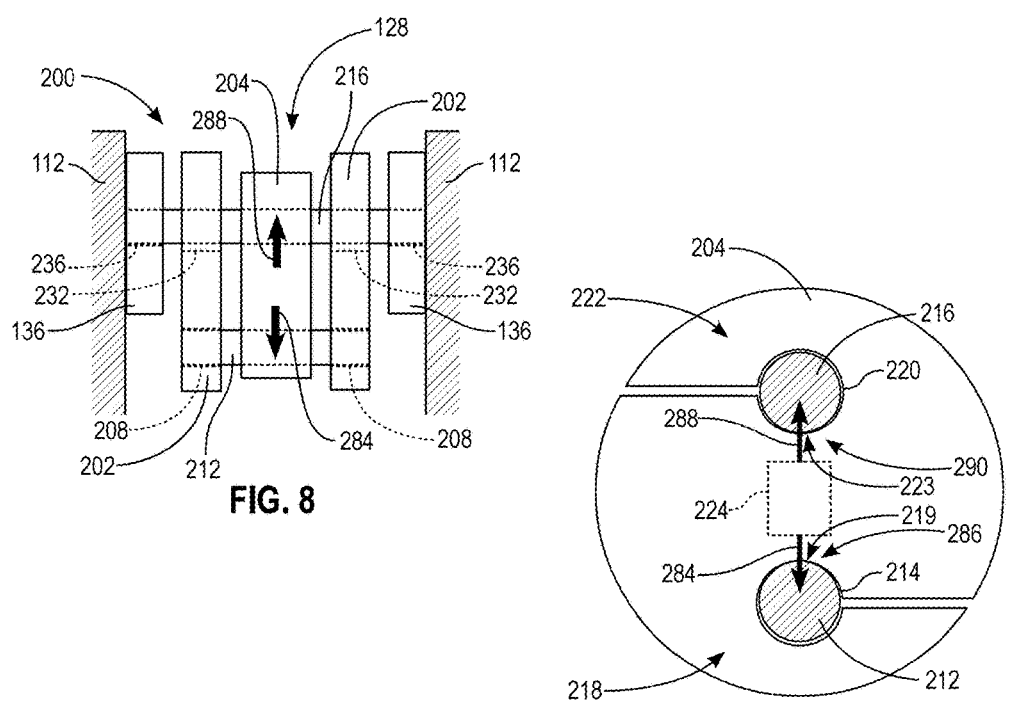
FIG. 8
FIG. 9
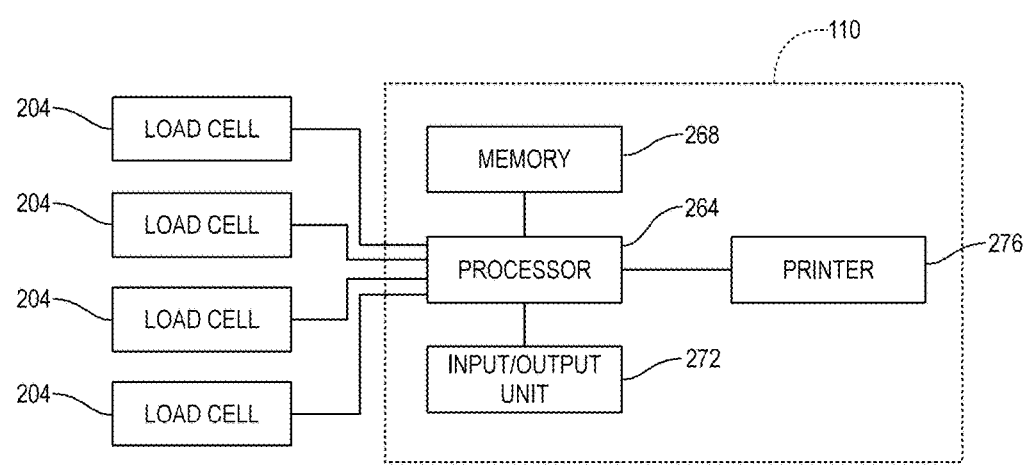
FIG. 10

SLOW SPEED WEIGH-IN-MOTION SYSTEM WITH FLEXURE

This is a continuation-in-part application of application Ser. No. 14/176,190, filed Feb. 10, 2014, the entirety of which is incorporated herein by reference.

TECHNICAL FIELD

This disclosure relates generally to weighing systems, and, in particular, to scales for weighing heavy loads.

BACKGROUND

Vehicles operating on roadways are often weighed to determine the axle weight and the total weight of the vehicle. In some operations, the weight of the vehicle is important to ensure compliance with weight restrictions on public roadways. Owners and operators of vehicles exceeding maximum legal weights are subject to fines, and in the event of an accident, can be subject to substantial financial liability for operating a vehicle exceeding the maximum legal weight. It is therefore desirable to weigh trucks and other vehicles which will be operating on public roadways.

One way vehicles are weighed is by driving the vehicle onto a static scale that is large enough to accommodate the entire vehicle. While such a scale is typically accurate to determine the load carried by the vehicle, such scales are very large and very expensive, and must be capable of accommodating and accurately measuring substantial weights. Furthermore, such scales do not enable determination of the weight carried by each individual axle of the vehicle.

Another weighing system involves driving the vehicle onto a smaller scale sized to weigh each individual axle. Such scales typically require driving the axles onto the scale individually, and stopping to weigh each axle. As the vehicle stops and restarts, the load carried by the vehicle can shift, resulting in weight readings that are not accurate. Additionally, the suspension of the vehicle can shift during the stopping and restarting of the vehicle, further reducing the accuracy of the weight measurement.

Some vehicle scales, such as the axle scale 20 shown in FIG. 1, are designed to weigh each axle of the vehicle as the vehicle drives over the scale 20 at a constant speed. Such scales typically include four load cells (only two are shown in FIG. 1) 24, 26 positioned underneath the scale, one located in each corner positioned inwardly from the outer edges of the weighing portion, also known as the active section 28. As the vehicle tires 32 pass over the active section of the scale, the load cells 24, 26 are compressed, and generate a load signal representing the weight of the axle passing over the scale 20.

However, as the vehicle tires 32 first roll onto the active section 28, the downward force 36 from the vehicle is outside an area between the load cells 24, 26 located under the active section 28. A moment 40 is therefore generated, whereby the load cells 26 opposite the tires 32 are urged upwardly 38 while the load cells 24 nearest the tires 32 are urged downwardly 39. A moment is generated in the opposite direction as the wheels pass the load cells under the opposite side of the active section. These moments affect the accuracy of the weight measurement, and make it more difficult to obtain a weight reading of the moving axles.

Additionally, in a typical axle scale 20, the load cells 24, 26 are designed to measure a compression force generated by the additional weight of the vehicle axle on the scale. The load cells 24, 26 support the platform of the active section 28 of the scale 20 from underneath the platform, as shown in FIGS. 1 and 2. As the vehicle tires 32 roll onto the platform, the momentum of the wheels urges the platform in the horizontal direction of movement of the vehicle, illustrated by arrow 44. This movement generates a moment 48 about the support of the load cells 24, 26, resulting in forward and downward movement of the active section 28 relative to the support of the load cells 24, 26. The downward force 36 from of the weight of the load further supplements the forward and downward movement of the active section 28. This forward and downward movement can result in inaccurate weighing of the vehicle.

In some scales, the platform is designed to abut against a stop located outside the active section of the scale in order to arrest this forward and downward movement, and the scale then settles back into the natural position. While such a solution is effective to stop the forward movement, it takes time for the platform to move against the stop and stabilize, increasing the time the axle must be on the scale to produce a weight reading.

Installation of a vehicle scale is a time consuming, cumbersome, and expensive process. Significant construction equipment is required to excavate the scale site, install a frame, and cast concrete pads within the scale site. Furthermore, specialized tools and knowledge are required to install and calibrate the load cells and the moving parts of the scale at the site. If installation is not performed precisely, the scale readings can be subject to substantial errors.

Once installed, typical vehicle scales require routine maintenance to remove objects and debris that can pass through a gap 56 (FIG. 1) between the active section 28 and the surrounding area. Performing this maintenance requires removal of the active section of the scale to clean the area underneath the platform. The active section of typical vehicle scales are difficult to remove, since the load cell, which is located underneath the platform, must be decoupled from either the base or the platform. Additionally, removal and replacement can sometimes require recalibration of the scale, which generally must be performed by a trained specialist.

A scale for heavy loads that has improved measurement accuracy is therefore desirable. Furthermore, it would be desirable to produce a scale for heavy loads that is simpler to install and maintain.

SUMMARY

In one embodiment a weighing system provides faster stabilization and improved weighing accuracy of a moving load. The weighing system has a base, a platform structure movable with respect to the base and including a planar top surface defining a horizontal plane, at least one flexure fixedly attached to the platform and the base, the at least one flexure configured to inhibit movement of the platform structure along the horizontal plane relative to the base, and a plurality of load cell assemblies, each of the plurality of load cell assemblies including an upper portion pivotably supported by the base through a first pivot assembly and a lower portion pivotably supporting the platform structure through a second pivot assembly, each of the plurality of load cell assemblies positioned such that when the upper portion of each of the plurality of load cell assemblies is projected onto the plane and the planar top surface is projected onto the plane, each of the projected upper portions is located outwardly of the projected planar top surface, wherein an axis of rotation of the first pivot assembly is parallel to an axis of rotation of the second pivot assembly.

In one or more embodiments, the platform structure includes a frame with a first beam, and the at least one flexure is fixedly attached to the first beam.

In one or more embodiments, the frame includes a second beam spaced apart from the first beam, and the at least one flexure is fixedly attached to the second beam.

In one or more embodiments, the platform includes at least one flexure opening, the at least one flexure is fixedly attached to the base by at least one bolt, and the at least one bolt is accessible through the planar top surface through the at least one flexure opening.

In one or more embodiments, the at least one flexure includes a plurality of flexures.

In one or more embodiments, each of the plurality of flexures is positioned such that as a vehicle passes over the platform structure during a weighing operation, each of a plurality of wheels of the vehicle passes directly above a respective one of the plurality of flexures.

In accordance with one embodiment, a method of providing a weighing apparatus includes forming a base having a scale opening, and a plurality of load cell openings opening laterally to the scale opening, providing a support member pair for each of the load cell openings, forming a platform structure, pivotably mounting a lower portion of each of a plurality of load cell assemblies to the platform structure through a first pivot assembly, fixedly connecting at least one flexure to the platform structure, supporting an upper portion of each of a plurality of load cell assemblies with a respective one of the support member pairs through a second pivot assembly, wherein an axis of rotation of the first pivot assembly is parallel to an axis of rotation of the second pivot assembly, and fixedly connecting the at least one flexure to the base after supporting the upper portion of each of the plurality of load cell assemblies.

In accordance with one or more embodiments, fixedly connecting at least one flexure to the platform structure includes fixedly connecting the at least one flexure to a first beam of a frame of the platform structure.

In accordance with one or more embodiments, fixedly connecting at least one flexure to the platform structure includes fixedly connecting the at least one flexure to a second beam of the frame of the platform structure, the second beam spaced apart from the first beam.

In accordance with one or more embodiments, fixedly connecting the at least one flexure to the base includes inserting a bolt at least partially through the at least one flexure and into a bolt hole in the base, accessing the bolt through a top surface of the platform structure, and tightening the accessed bolt.

In accordance with one or more embodiments, fixedly connecting at least one flexure to the platform structure includes positioning each of a plurality of flexures such that as a vehicle passes over the platform structure during a weighing operation, each of a plurality of wheels of the vehicle passes directly above a respective one of the plurality of flexures, and fixedly connecting each of the positioned plurality of flexures to the platform structure.

In accordance with one or more embodiments, a method of weighing a vehicle includes moving at least a portion of a vehicle onto a platform structure including a planar top surface defining a horizontal plane by movement of a portion of the vehicle past at least two of a plurality of load cell assemblies and then onto a platform structure, wherein the platform structure is supported by a plurality of load cell assemblies through a plurality of first load transfer areas, and each of the plurality of load cell assemblies is supported by a base through a respective one of a plurality of first load transfer areas, each of the first load transfer areas located farther from the horizontal plane than each of the second load transfer areas, inhibiting movement of the platform structure along the horizontal plane using at least one flexure fixedly attached to the platform structure and the base, forcing each of the second load transfer areas from a neutral position directly away from the horizontal plane by moving the at least a portion of the vehicle onto the platform structure, and determining a weight based upon signals generated by the plurality of load cell assemblies.

In accordance with one or more embodiments, inhibiting movement of the platform structure along the horizontal plane includes inhibiting movement of the platform structure along the horizontal plane using at least one flexure fixedly attached a first beam of a frame of the platform structure.

In accordance with one or more embodiments, inhibiting movement of the platform structure along the horizontal plane includes inhibiting movement of the platform structure along the horizontal plane using at least one flexure fixedly attached to a second beam of the frame of the platform structure, the second beam spaced apart from the first beam.

In accordance with one or more embodiments, moving at least a portion of a vehicle onto a platform structure includes moving each of a plurality of wheels of the vehicle directly above a respective one of the plurality of flexures.

BRIEF DESCRIPTION OF THE DRAWINGS

FIG. 8 is a front cross-sectional view of the connecting assembly of FIG. 6.

FIG. 9 is a side view of the load cell assembly of the axle scale of FIG. 3.

FIG. 10 is a schematic diagram of the load cells and controller of the prefabricated axle scale of FIG. 3.

DETAILED DESCRIPTION

Figure 2:
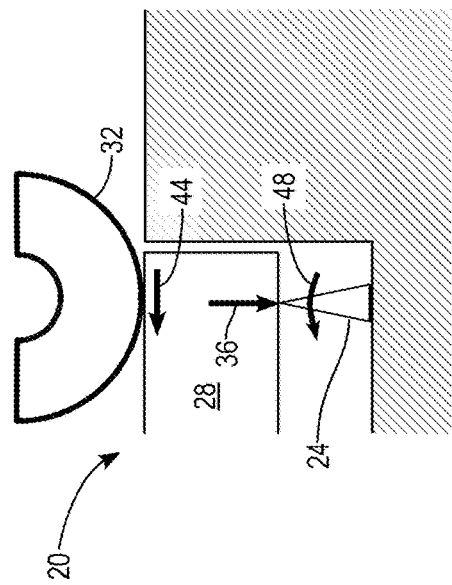
FIG. 2 is a partial side schematic cut away view of a tire moving across an active section of a prior art axle scale showing a moment produced about the supports of the active section.

For the purpose of promoting an understanding of the principles of the disclosure, reference will now be made to the embodiments illustrated in the drawings and described in the following written specification. It is understood that no limitation to the scope of the disclosure is thereby intended. It is further understood that this disclosure includes any alterations and modifications to the illustrated embodiments and includes further applications of the principles of the disclosure as would normally occur to one skilled in the art to which this disclosure pertains.

Figure 3:
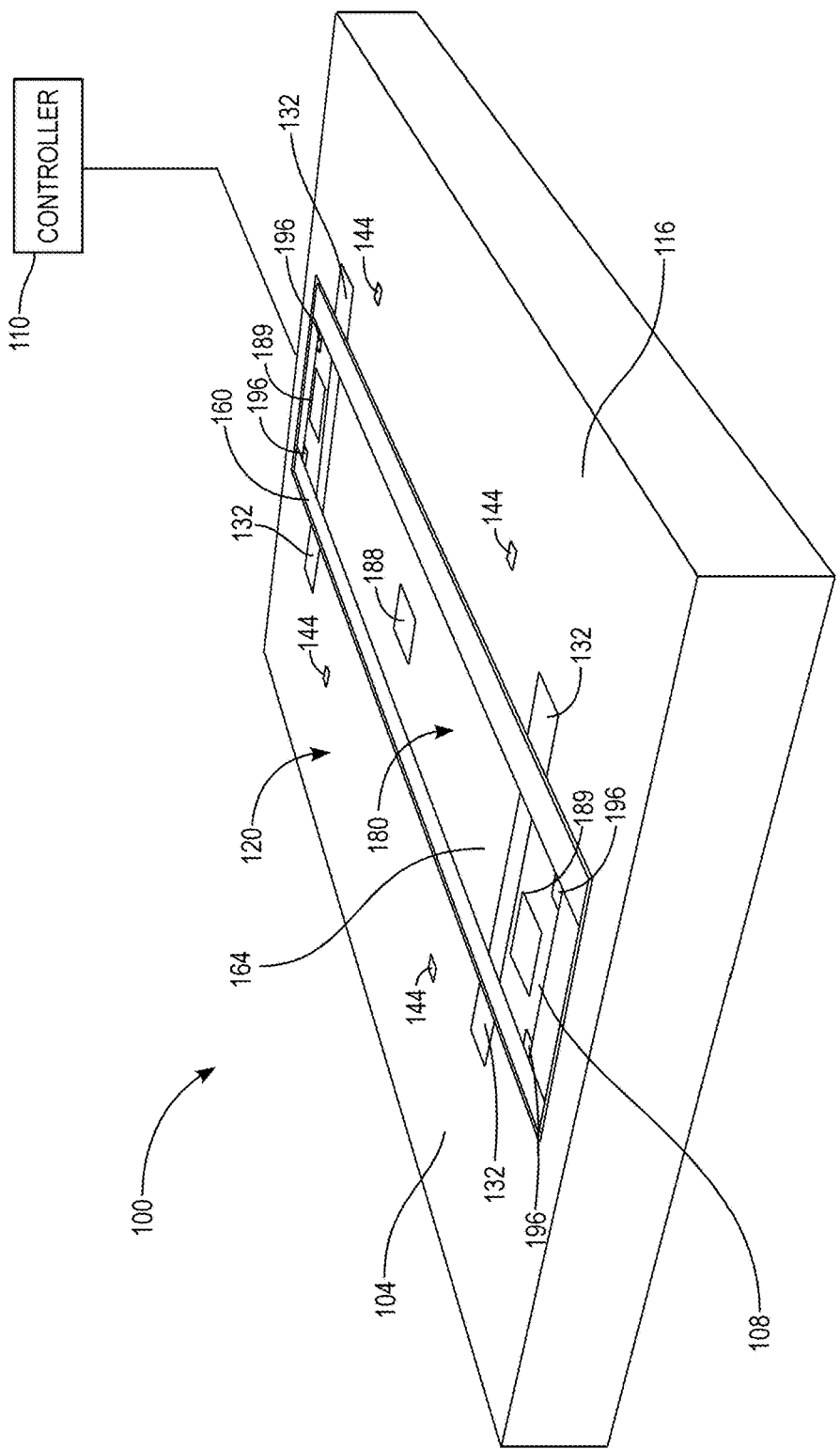
FIG. 3 is a side perspective view of a prefabricated axle scale.

FIG. 3 illustrates a perspective view of a prefabricated vehicle axle scale 100. The axle scale 100 includes a base 104, a platform structure 108, and a controller 110.

Figure 4:
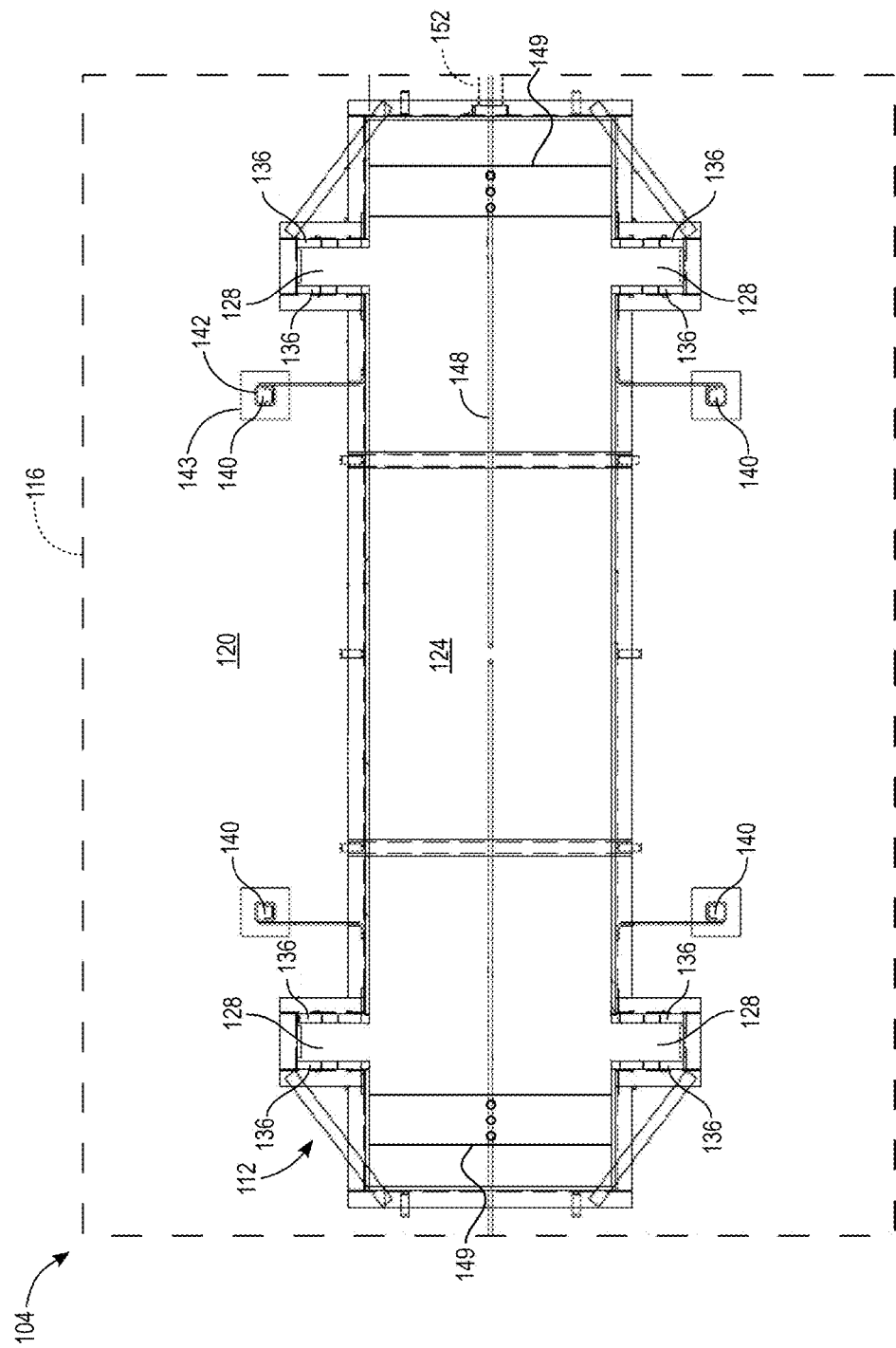
FIG. 4 is a top plan view of the base portion of the prefabricated axle scale of FIG. 3 showing the base frame located within the base portion and the platform structure removed for clarity.

With further reference to FIG. 4, which shows the axle scale 100 with the platform structure 108 removed, in the illustrated embodiment, the base 104 is shaped substantially as a rectangular prism. In other embodiments, however, the base has a different shape, for example a trapezoidal, rounded, or irregular shape. The base 104 includes a base frame 112 and a concrete body 116 (shown in shadow in FIG. 4), which defines a generally flat upper surface 120 of the base 104.

The base frame 112 is surrounded by the concrete body 116 and defines a scale or platform opening 124. The base frame 112 is formed of structural steel, for example C-channel steel, webbed steel beams, or steel plates, welded together in the shape of a rectangle having four load cell openings 128 extending outwardly therefrom. Each load cell opening 128 opens laterally to the platform opening 124 and is covered by a removable load cell cover 132, which is substantially flush with the upper surface 120 of the concrete body 116. As will be described in greater detail below, each load cell opening 128 includes a support member pair, which in the illustrated embodiment is provided by two saddle members 136 affixed to the base frame 112, with one saddle member 136 on each lateral side of the load cell openings 128.

The base 104 has four lift members 140 positioned symmetrically about the vertical and horizontal axes of the base 104. Each of the lift members 140 is anchored in a well 142 in the concrete body 116 by support plates 143 embedded in the concrete body 116, and are accessed through a lift member covering plate 144 that is substantially coplanar with the upper surface 120 of the concrete body 116. Each lift member 140 includes an attachment member (not shown), for example one or more chain links, fixed in the well 142 to enable a lifting device, such as a forklift, a crane, or a backhoe, to attach to the lift members 140 with a chain or hook.

The base 104 further includes a cable conduit 148 embedded in the concrete body 116 beneath the platform opening 124. In the illustrated embodiment, the cable conduit 148 is one inch diameter PVC and extends along the longitudinal axis of the base portion, though in other embodiments other sizes and materials are used for the cable conduit 148 and the cable conduit 148 runs in a different orientation within the concrete body 116. The cable conduit 148 is configured to carry wires that connect components within the platform structure 108, such as load cells, to the controller 110. Two flexure bases 149 including a plurality of bolt holes are provided in the base 104. The bolts holes are substantially centered within the platform opening 124.

The base 104 also includes a drain aperture 152 (shown in shadow in FIG. 4) extending through the concrete body 116 at one end of the platform opening 124. The drain aperture 152 is located at or below a bottom surface of the platform opening 124 such that water and other liquids drain out of the platform opening 124 through the drain aperture 152.

Figure 5:
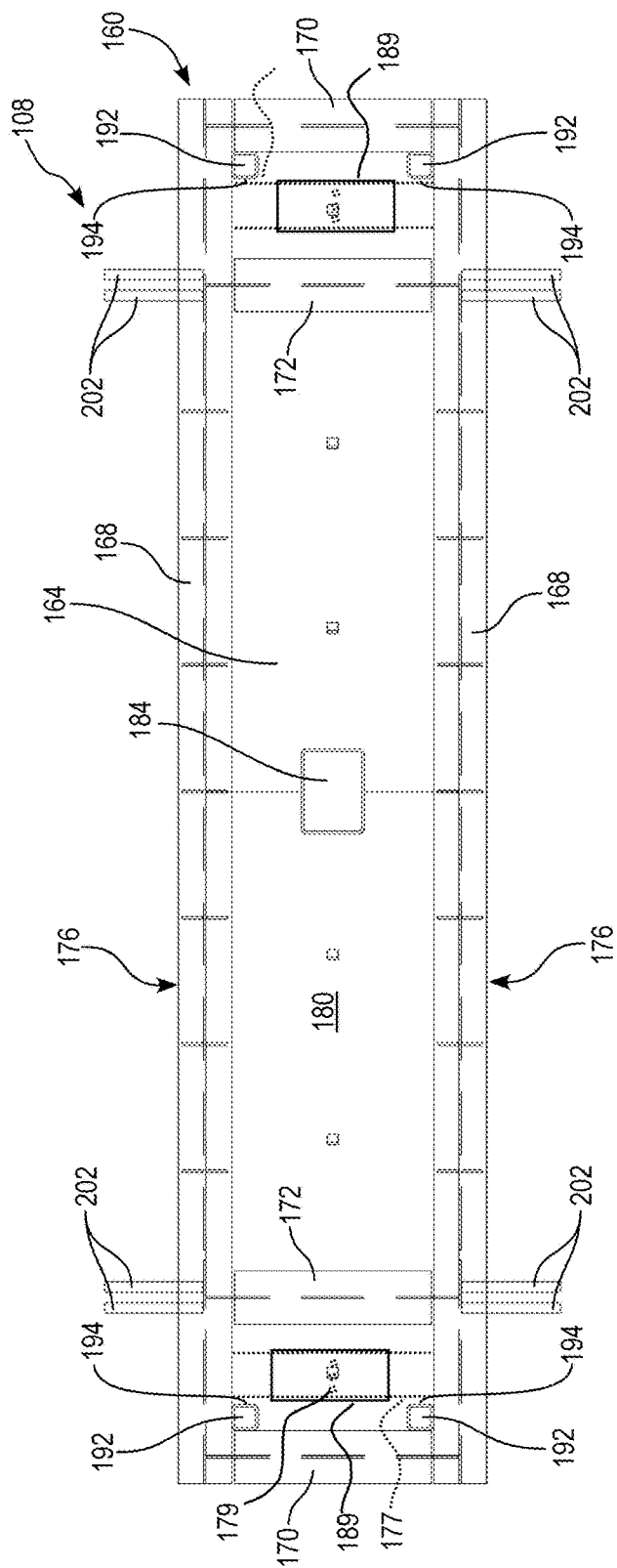
FIG. 5 is a top plan view of the platform structure of the prefabricated axle scale of FIG. 3.

Referring now to FIG. 5, which is a top plan view of the platform structure 108, with continuing reference to FIG. 3, the platform structure 108 includes a platform frame 160 surrounding an inner concrete body 164. The platform frame 160 includes steel beams 168, 170, and 172, which, in one embodiment are W5×19 steel beams, welded together. Two flexures 177 extend between the lower surfaces of the beams 168. In some embodiments a single flexure is provided while in other embodiments more than two are provided. In some embodiments, the flexures are positioned such that wheels of a vehicle pass directly above the flexures as the vehicle passes over the platform during a weighing operation. The flexures 177 are stainless steel plates of about 20-60 thousandths of an inch, and preferably about 30 thousandths of an inch. In one embodiment, the flexures 177 are about 7.5 inches in width and formed from a form of steel such as stainless steel, carbon steel, etc.

Figure 5A:
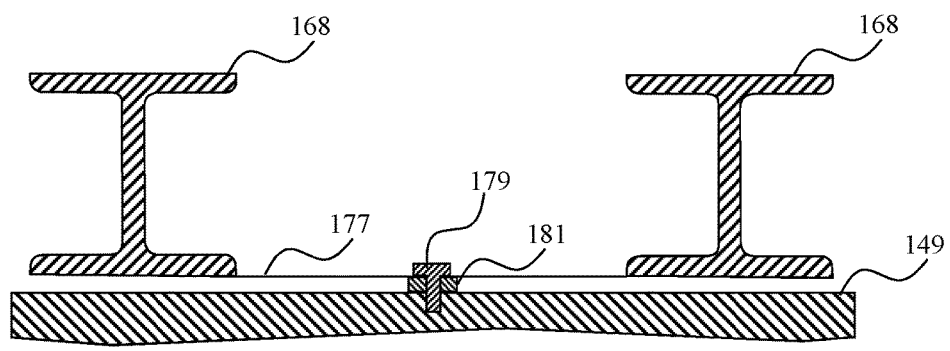
FIG. 5A depicts a simplified cross-sectional schematic view of a flexure plate extending between lower surfaces of the beams of the platform structure of FIG. 5.

Two flexure cover plates 189 cover flexure openings in the platform structure 108 and are removable to provide access to the flexures from above the platform structure 108 so that bolts 179 can be used to bolt the flexures 177 to the flexure bases 149. When fixedly connected to both the platform structure 108 and the flexure bases 149 as shown in FIG. 5A, the flexures 177 are preferably substantially planar, and parallel to a horizontal planar top surface 180 of the platform structure 108. To reduce any deflection of the flexures 177 out of this configuration, shims 181 may be positioned as necessary between the flexures 177 and the flexure bases 149.

The platform frame 160 defines a rectangular shape and is sized to fit within the platform opening 124 of the base 104 with a minimal clearance, which, in one embodiment, is approximately ½ inch on each side of the platform frame 160. The long steel beams 168 define outer edges 176, which are substantially aligned with the long edges of the platform opening 124 when the platform structure 108 is installed in the platform opening 124.

Figure 1:
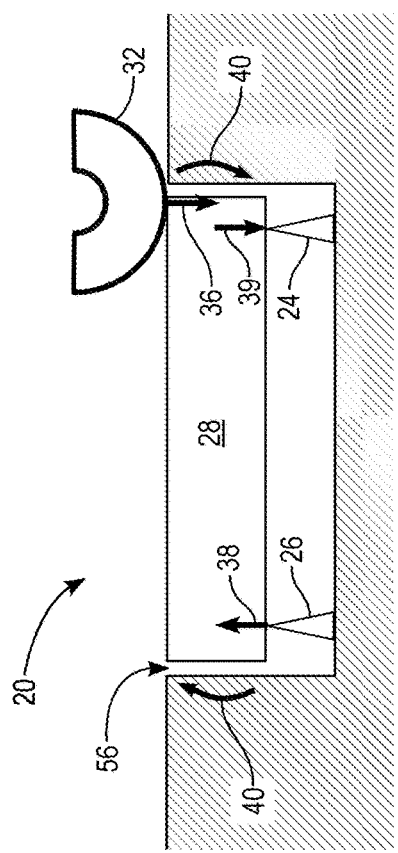
FIG. 1 is a side schematic cut away view of a tire on an active section of a prior art axle scale showing a tipping moment produced on the active section.

The top surface of the inner concrete body 164, along with the top surface of the steel beams 168, 170, 172 define a horizontal planar top surface 180 of the platform structure 108, which is substantially coplanar with the upper surface 120 of the base 104. An opening 184 is defined in the inner concrete body 164 to enable maintenance and connection of wires within the platform structure 108. In some embodiments, an electronic module (not shown) is located within the opening 184 to facilitate connection of the wires in the platform structure 108. The opening 184 is covered by an opening cover plate 188 (FIG. 1), which has a surface that is substantially coplanar with the top surface 180 of the platform structure 108.

Four anchor points 192 are embedded in wells 194 in the inner concrete body 164 and are attached to the outer steel beams 168, 170 at each inside corner of the outer steel beams 168, 170. The anchor points 192 are functionally the same as the lift members 140 of the base 104, and each anchor point 192 is accessed through an anchor plate 196 configured to be flush with the top surface 180 of the platform structure 108. Each anchor point 192 further includes an attachment member (not shown), for example one or more chain links, fixed in the anchor point 192 to enable a lifting device, such as a forklift, a crane, or a backhoe, to attach to the anchor point 192 with a chain or hook.

Figure 6:
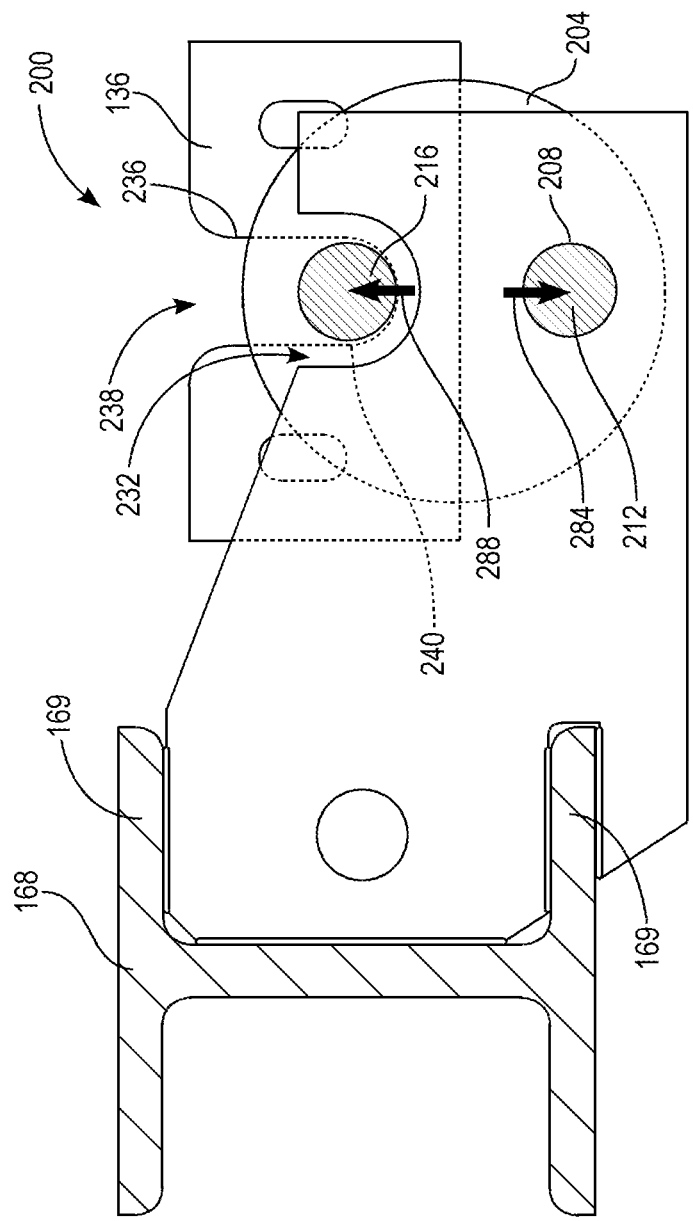
FIG. 6 is a partial side cross-sectional view through the connecting assembly of the axle scale of FIG. 3 showing the connecting plate, the load cell, and the saddle member.
Figure 7:
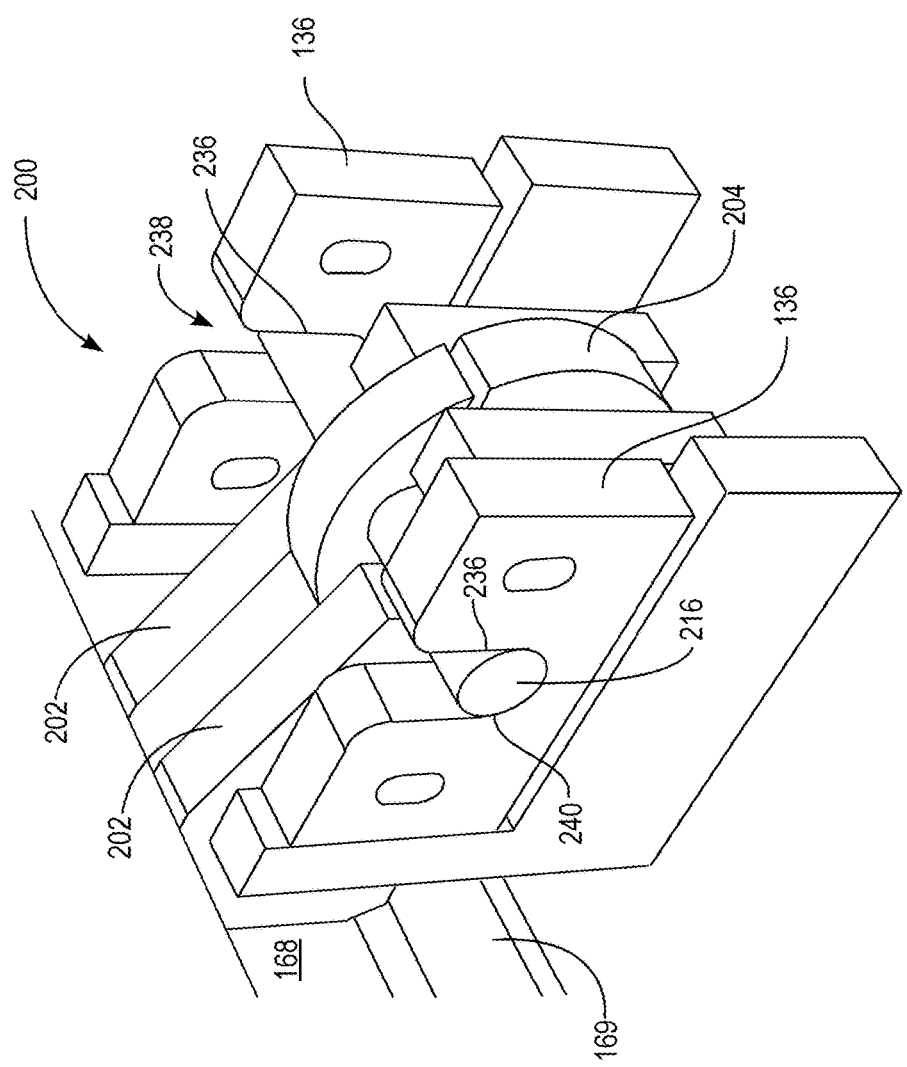
FIG. 7 is a side perspective view of the connecting assembly of FIG. 6, with the base removed for clarity.

The platform structure 108 is supported by four connecting assemblies 200, which are illustrated in FIGS. 6-8, each of which is positioned in one of the load cell openings 128 when assembled. The connecting assemblies 200 each include two connecting plates 202, a load cell assembly 204, a load pin 212, a fulcrum pin 216, and the pair of saddle members 136. Each pair of connecting plates 202 supports the load cell assembly 204. Each of the connecting plates 202 has a first end shaped to fit vertically between the flanges 169 of steel beam 168, and the first end is welded securely to the flanges 169 and the web of the steel beam 168. Opposite the first end, the connecting plates 202 include load pin apertures 208, which support the ends of the load pin 212.

As is illustrated in FIGS. 6-9, the load pin 212 extends between the connecting plates 202 through a load pin opening 214 in a lower portion 218 of the load cell assembly 204. The load pin opening 214 is chamfered, having a lesser diameter at the top than at the bottom of the load pin opening 214. The load pin 212 thus rests at the top of the load pin opening 214, against a bearing surface 219 in the load cell assembly 204. The fulcrum pin 216 extends between the saddle members 136 through a fulcrum pin opening 220 in an upper portion 222 of the load cell assembly 204, above the load pin 212. The fulcrum pin opening 220 is also chamfered, having a lesser diameter at the bottom than at the top of the fulcrum pin opening 220. The fulcrum pin 216 thus rests at the bottom of the fulcrum pin opening 220, against a bearing surface 223. Since the load pin 212 and the fulcrum pin 216 are supported against the bearing surfaces 219, 223, respectively, the load cell assembly 204 is pivotable relative to the platform structure 108 and the base 104 and, in particular, the load pin 212 rotates about the fulcrum pin 216. Each of the load pin 212 and the fulcrum pin 216 is operably connected to a strain sensing component 224 of the load cell assembly 204. In one embodiment, the load cell assembly 204 is a model T95 shear beam load cell sold by Thames-Side Sensors Limited, though other desired load cell assemblies are used in other embodiments.

The fulcrum pin 216 extends through a fulcrum pin opening 232 in the connecting plates 202 without contacting either of the connecting plates 202. The saddle members 136 include saddle grooves 236 having a tapered "U"-shape with upwardly opening mouth portions 238 and closed lower portions 240. In some embodiments, one or more of the saddle grooves 236 have a "V"-shape or a trapezoidal shape, and in some embodiments the saddle grooves 236 of the saddle members 136 are shaped differently from the opposing saddle member 136. As is best shown in FIGS. 6 and 7, the ends of the fulcrum pin 216 rest in the closed lower portion 240 of the saddle groove 236 of the saddle member 136.

FIG. 10 is a schematic diagram of the controller 110 and the components communicating with the controller 110 in the axle scale 100. Operation and control of the various components and functions of the axle scale 100 are performed with the aid of the controller 110. The controller 110 is implemented with a general or specialized programmable processor 264 that executes programmed instructions. In some embodiments, the controller includes more than one general or specialized programmable processor. The instructions and data required to perform the programmed functions are stored in a memory unit 268 associated with the controller 110. The processor 264, memory 268, and interface circuitry configure the controller 110 to perform the functions described above and the processes described below. These components can be provided on a printed circuit card or provided as a circuit in an application specific integrated circuit (ASIC). Each of the circuits can be implemented with a separate processor or multiple circuits can be implemented on the same processor. Alternatively, the circuits can be implemented with discrete components or circuits provided in VLSI circuits. Also, the circuits described herein can be implemented with a combination of processors, ASICs, discrete components, or VLSI circuits.

The processor 264 is operably connected to and configured to obtain the load signals generated by the load cells 204, and the load signals obtained by the processor 264 are stored in the memory 268 of the controller 110. The controller 110 further includes an input/output device 272 operably connected to the processor 264 to enable a user to input parameters and activate operating algorithms for the processor 264, and to enable the controller 110 to display information to the user of the axle scale 100. The processor 264 is also operably connected to a printer 276, and is configured to transmit electronic signals to the printer 276 to operate the printer to print a receipt indicating the axle loads determined by the processor 264. In the illustrated embodiment, the processor 264, the memory 268, the input/output unit 272, and the printer 276 are all contained within a common housing of the controller 110, which is installed proximate to the base 104 and platform structure 108 of the axle scale 100. In other embodiments, one or more of the control components, for example the printer 276, are located remote from the common housing of the controller 110.

To operate the axle scale 100, a user activates a command on the input/output unit 272 of the controller 110 of the axle scale 100 indicating that a vehicle is to be driven over the scale 100. In some embodiments, the user activates the command remotely via, for example, Wi-Fi, Bluetooth, infrared, or another desired wireless transmission. In yet another embodiment, the controller 110 is configured to automatically register the presence of the vehicle and autonomously activates the command using, for example, a radio frequency identification ("RFID") tag on the vehicle. In further embodiments, the ready command is automatically activated by the controller 110 upon detection of a predetermined weight on the scale 100, indicating that a weighing operation is commencing.

The user then drives the vehicle over the axle scale 100. In one embodiment, the vehicle is driven over the scale at a constant speed of approximately 2-5 miles per hour. As illustrated in FIGS. 6, 9, 11, and 12, as the vehicle rolls over the axle scale 100, the wheels 32 of each axle first pass onto the upper surface 120 of the base 104. The wheels of the axle subsequently pass onto the top surface 180 of the platform structure 108. In one embodiment, the base 104 of the axle scale 100 is sized such that, for a semi-truck having tandem axles, the wheels of both tandem axles are on the upper surface 120 of the base 104 prior to the wheels of the leading axle moving onto the top surface 180 of the platform structure 108. This provides a stable base for the wheels of the tandem axle that is not on the platform structure 108 while the other axle is being weighed by the platform structure 108.

As the wheels pass onto the top surface 180 of the platform structure 108, the flexures 177 inhibit movement of the platform structure 108 within the opening 124. Specifically, the half of the flexure 177 which is subjected to tension along the horizontal plane resist movement along the horizontal plane. Accordingly, in some embodiments wherein vehicles move only in a single direction, the flexures are connected to the platform structure only at a location proximate the location at which the vehicle moves onto the platform.

Additionally, the force 280 from the wheels 32 acts downwardly on the steel beams 168, 170, 172 and the inner concrete body 164. The downward force from the steel beams 168 is transferred to the connecting plates 202, which subsequently apply downward load force components 284 to the load pins 212 at a lower load transfer area 286. In response to the downward load force components 284, the fulcrum pins 216 are subjected to an upward reaction force 288 from the saddle groove 236, which is also imparted on the load cell assembly 204 at upper load transfer area 290.

The load cell assembly 204 is configured to periodically generate an electronic signal indicative of the tension force between the load pin 212 and the fulcrum pin 216 as measured by the strain sensing component 224. In one embodiment, the load cell assembly 204 is configured to generate the electronic signal at 100 Hz, though in other embodiments alternative sampling rates are used. The processor 264 receives the electronic signals from the load cell assemblies 204 and stores the data in memory 268.

Figure 13A:
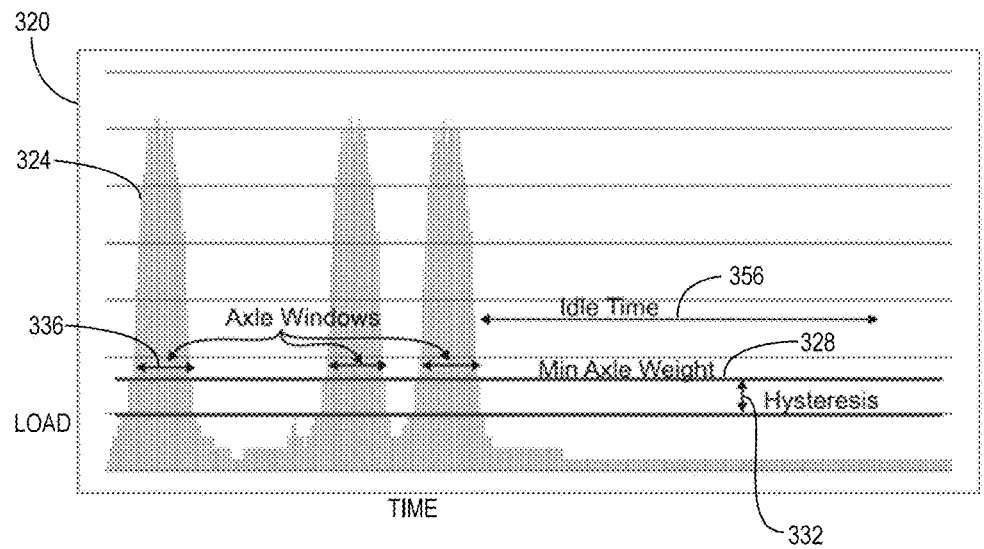
FIG. 13A is a graph showing the load cell readings for a vehicle axle passing over a load cell assembly of the axle scale of FIG. 1.

FIG. 13A illustrates a graph 320 of load values, 324, or the force measured by a load cell, over time for a vehicle driving over the axle scale 100. Each load value 324 on the graph 320 represents a reading from the load cells, or an average of load cell readings over a predetermined time period. As an axle begins moving onto the scale, the load values 324 increase until a minimum axle load 328 is reached. An axle window 336 begins at the time when the load values 324 reach the minimum axle load 328. The processor 264 thus begins storing the load values 324 in the memory 268 as being associated with the axle window 336, shown in further detail in FIG. 13B. The load values 324 increase to a "plateau" while the wheels of the axle are on the scale, and then decrease as the wheels of the axle move off the scale. The flexures 177 reduce the time needed for the plateau to be realized. The flatness at the top of the plateau depends on numerous variables and parameters. Once the load values 324 decrease below a value representing a predetermined hysteresis value 332 subtracted from the minimum axle load 328, the processor 264 ceases to record the load values 324 in the axle window 336. In some embodiments, the processor is configured to generate an error if the number of load values in the axle window is below a predetermined number, indicating that the vehicle was driven over the axle scale too fast.

The processor 264 is configured to identify a predetermined window offset 344, which, in one embodiment, is 30% of the load values 324 in the axle window 336, and a stabilized window 348, which includes a predetermined number or percentage of load values 324 immediately following the end of the window offset 344. In one embodiment, the stabilized window includes 40% of the load values 324 in the axle window 336. The load values 324 in the window offset 344 and the load values 324 occurring after the stabilized window 348 are discarded, leaving only the stabilized load values 352 within the stabilized window 348.

Once stabilized load values 352 are available, the processor determines a final load value by averaging the stabilized load values 352 from the stabilized window 348. The final load value for the axle is then stored in the memory 268.

Referring back to FIG. 13A, the processor 264 continues to obtain the load readings 324 from the load cell assemblies 204 for each individual axle passing over the platform structure 108, calculating the final axle load for each axle of the vehicle. Once the processor 264 identifies that the vehicle has completely passed over the platform structure 108, by, for example identifying that the load values 324 do not exceed the minimum axle load 328 for a predetermined idle time 356, the processor 264 sums the calculated axle loads and displays the total vehicle load and axle loads on the input/output unit 272 and/or operates the printer 276 to print a receipt indicating the total vehicle weight and the individual axle loads.

Figure 11:
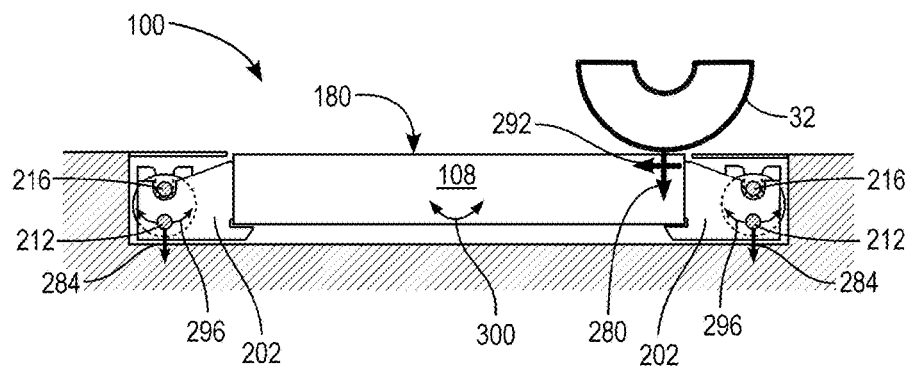
FIG. 11 is a side schematic view of a tire moving across the axle scale of FIG. 1.
Figure 12:
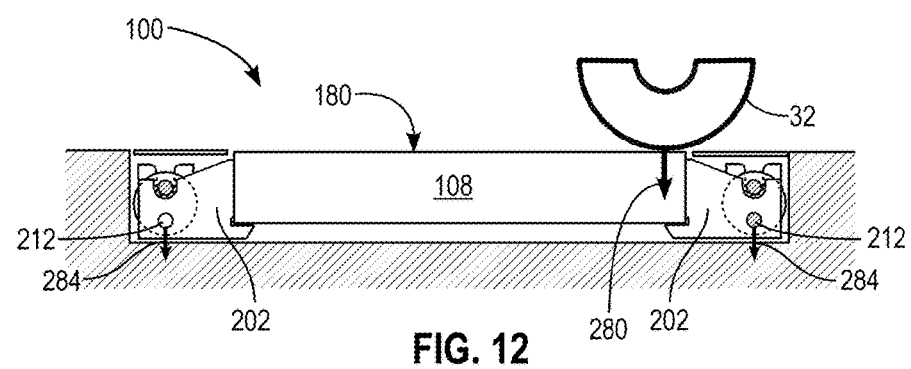
FIG. 12 is a side schematic view of a tire moving onto the axle scale of FIG. 1.

The configuration of FIGS. 3-10 provides substantial benefits over known axle scales. For example, the load cells 204 are pivotable relative to the platform structure 108 and the base 104, as shown in FIGS. 6 and 11. Lateral motion 292 imparted on the platform structure 108 of the scale 100 is transmitted through the connecting plates 202 to the load pin 212. The load pin 212 is configured to move in an arcuate path 296 centered about the fulcrum pin 216. Since the load pin 212 is positioned below the fulcrum pin 216, an upward motion of the load pin 212 is required in order for the load pin 212 to move about the fulcrum pin 216 along the arcuate path 296. The load pins 212 are fixed to the platform structure 108, and therefore the platform structure 108 moves in an arcuate path 300 having a radius equal to the radius of the arcuate path 296 of the load pins 212. As a result, an upward motion of the platform structure 108 is necessary for the scale portion to move horizontally in response to lateral forces 292 produced by a load, for example vehicle tire 32, moving across the top surface 180 of the platform structure 108. This upward motion is opposed by the downward load force 280 from the weight of the load on the platform structure 108, which is transferred through the connecting plates 202 to the load pins 212 as downward force components 284. Consequently, in contrast to the prior art axle scale 20 depicted in FIG. 2, the platform structure 108 of the axle scale 100 acts as a self-stabilizing pendulum, as the load force 280 dampens lateral motion 292 of the platform structure 108 with each pendulum stroke of the platform structure 108. The flexures 177 further dampen lateral motion.

Figure 13B:
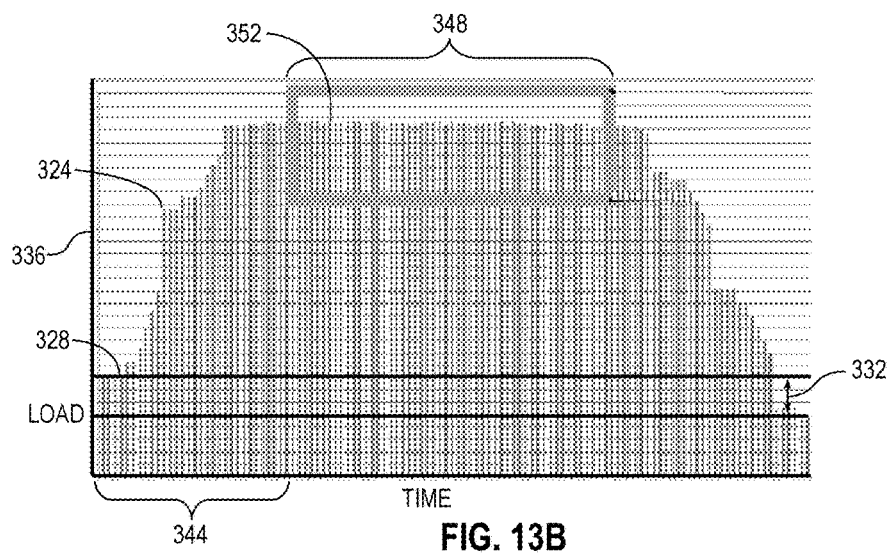
FIG. 13B is a graph showing the load cell readings for a vehicle axle passing over a load cell assembly of the axle scale of FIG. 1.

Additionally, since the load cells 204, if projected onto a plane parallel to the plane defined by the top surface 180 of the platform structure 108, are positioned horizontally displaced from the top surface 80 so as to be outside the area of the top surface 180 projected onto the same plane, an object on the platform structure 108, for example vehicle tire 32 (FIG. 12), will always be inside an area bounded by the load cell assemblies 204. As a result, in contrast to the prior art axle scale 20 depicted in FIG. 1, no tipping moment is generated about the load cell assemblies 204 when the vehicle tire 32 passes from the upper surface 120 of the base 104 to the top surface 180 of the platform structure 108. All load cell assemblies 204, therefore, will only be subject to load force components 284 directed downwardly, which results in less jitter in the load readings and quicker stabilization of the load readings to the stabilized load zone 348 (FIG. 13B).

Figure 14:
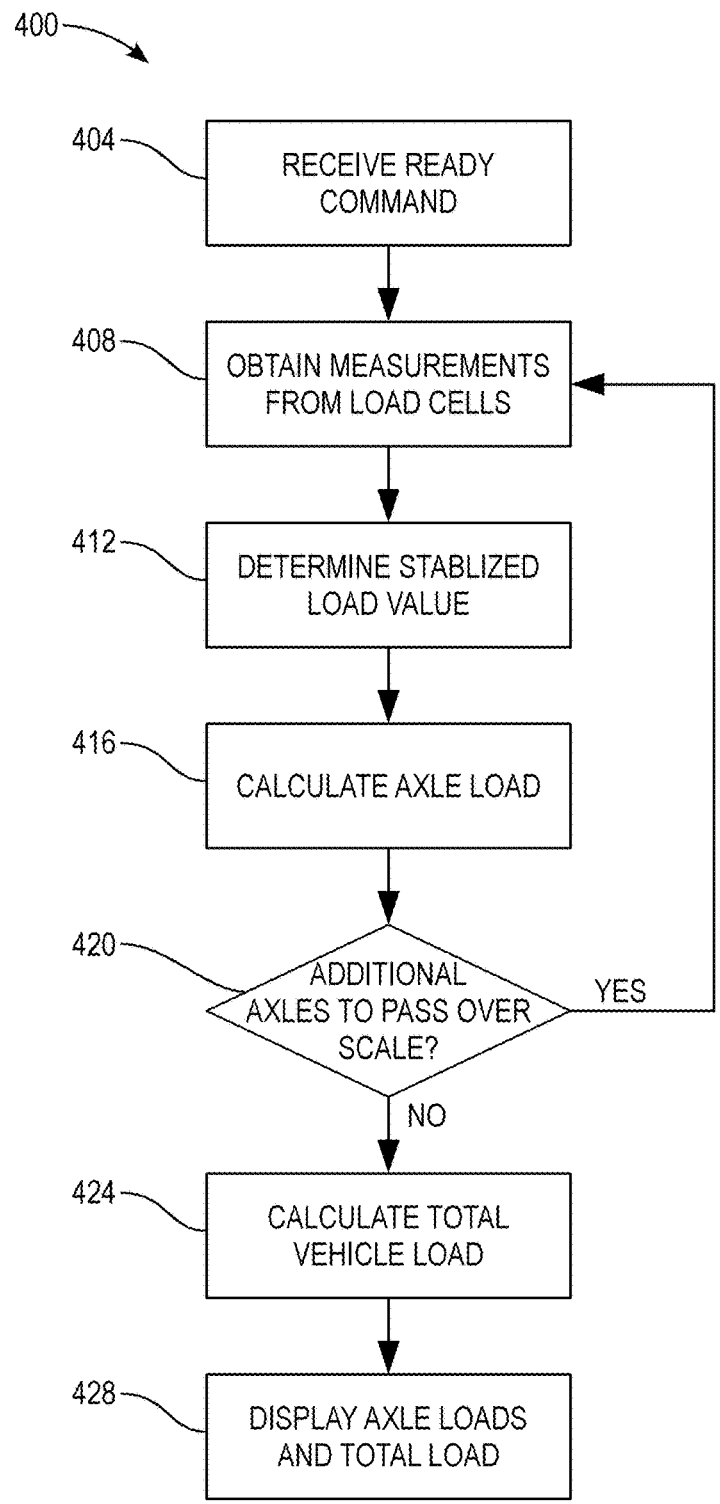
FIG. 14 is a process diagram of a method of operating an axle scale.

A process diagram of a method 400 of weighing a vehicle is depicted in FIG. 14. The process refers to a processor, such as processor 264, executing programmed instructions stored in a memory associated with the processor to operate the components in an axle scale, such as axle scale 100, to implement the method 400.

The process begins with the processor receiving an input indicating that a weighing operation is commencing (block 404). In one embodiment, the input is indicative only that a vehicle is about to be driven over or is being driven on the scale. In another embodiment, the input is associated with a particular vehicle, and can correspond to a pre-load weight or a post-loading weight to enable determination of net weight of the load in the vehicle. In some embodiments, the controller is configured to receive an indication that a weighing operation is commencing by receiving signals from the load cells indicating that a vehicle is moving onto the scale, for example by identifying that the load on the load cells exceeds a minimum axle load. In another embodiment, the input is received directly at an input/output unit of the controller, while in other embodiments the input is transmitted wirelessly by a remote using Wi-Fi, Bluetooth, or infrared, or automatically received from a wireless device, for example an RFID tag on the vehicle.

The vehicle is then driven over the scale at a constant or substantially constant speed. In some embodiments, the processor is connected to an alarm light or speaker to produce a visual or audible warning to the driver that the vehicle exceeds a maximum speed at which the scale can obtain an accurate reading. As the vehicle drives over the scale, the load cells are forced away from their neutral position and the controller obtains electronic signals from the load cells corresponding to the force components of the load on each individual load cell and stores the readings in the memory (block 408). In one embodiment, the processor sends commands to the load cells to activate the load cells to generate the load signals, while in another embodiment the load cells are configured to transmit the load signals autonomously in response to a load being detected or the load cells are configured to constantly transmit load signals. In yet another embodiment, the load cells continuously generate load signals, and the processor retrieves the load signals as needed. The load readings from the load cells increase rapidly as the tires from the axle move onto the scale. As the tires continue to roll across the scale, the load readings stabilize at a plateau, or stabilized load value, which is representative of the weight of the axle on the scale. The controller determines the stabilized load value of the load cell readings (block 412) from each of the load cells. As discussed above, the stabilized load value is determined by identifying the load cell readings falling within a stabilized window, which is a predetermined percentage of the load cell readings occurring in an axle window after a window offset is identified. The stabilized load values are then averaged to calculate the total axle load, which is stored in the memory (block 416).

If there are additional axles to pass over the scale (block 420), then the process continues at block 408. If all the axles have passed over the scale, then the processor proceeds to calculate the total vehicle load (block 424) by summing the individual axle loads stored in the memory at block 416. The processor then displays the individual axle loads and the total vehicle load (block 428). In one embodiment, the loads are displayed on a screen of the input/output unit of the controller and printed onto a receipt using a printer, while in other embodiments the loads are ether displayed on the screen or printed onto a receipt. In some embodiments, the axle and total loads are stored in the memory, while in other embodiments the axle and total loads are transmitted to an external device, such as a computer or a smartphone, via, for example, a serial, Ethernet, Wi-Fi, or Bluetooth connection. In further embodiments, the axle and load data is stored in "the cloud" and printed remotely of the axle scale. In some embodiments, the processor is further configured to recall a vehicle load from a previous pass over the scale by the same vehicle, and determine the net load of the vehicle by subtracting the stored load in the previous pass from the total load determined at block 424.

Figure 15:
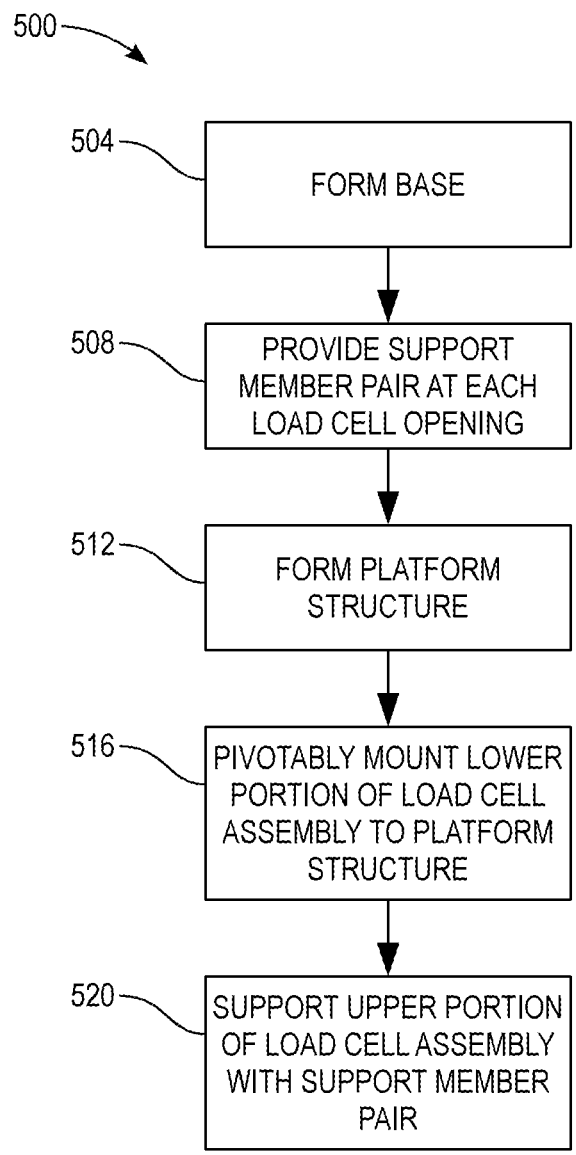
FIG. 15 is a process diagram of a method of manufacturing a prefabricated axle scale.

Advantageously, the axle scale 100 can be manufactured at a location remote from the installation site and can be installed as a prefabricated axle scale. A process diagram of a method 500 of manufacturing such a weighing system is depicted in FIG. 15. The process begins with the forming of a base having a scale opening and a plurality of load cell openings opening laterally to the scale opening (block 504). In one embodiment, the base is formed by assembling a steel base frame to define the scale opening and the load cell openings and then casting concrete in the shape of a rectangular prism around the steel base frame.

A support member pair is provided for each of the load cell openings (block 508). In one embodiment, the support member pair is provided during the forming of the base by, for example, welding the support member pairs onto the base frame as the base frame is being assembled. In another embodiment, the support member pairs are provided after formation of the base.

The process continues with the formation of a platform structure (block 512). In some embodiments, the platform structure is formed after formation of the base, while in other embodiments, the platform structure is formed before or during formation of the base. In one embodiment, the platform structure is formed by assembling a platform frame of, for example, webbed steel beams in the shape of a rectangle, and casting concrete within the platform frame to form a planar horizontal top surface of the platform structure.

A lower portion of each of a plurality of load cell assemblies is mounted pivotably to the platform structure, extending outwardly from the platform structure (block 516). In one embodiment, the load cell assemblies are attached to the steel beams of the platform frame with a connection plate, and a load pin extends between the connection plates through the lower portion of the load cell assembly.

Finally, an upper portion of each of the plurality of load cell assemblies are supported in a respective one of the support member pairs at their neutral (i.e. unloaded) position (block 520). In one embodiment, the load cell assemblies are each connected to a fulcrum pin, which engages a saddle groove in each of the support members or the respective support member pair as the platform structure is lowered into the platform opening in the base. The flexure cover plates 189 can then be removed, if present, and the bolts 179 used to fixedly bolt the flexures 177 to the flexure bases 149. The bolts in one embodiment are removable to allow for disassembly of the system. The flexure cover plates 189 are then installed.

Figure 16:
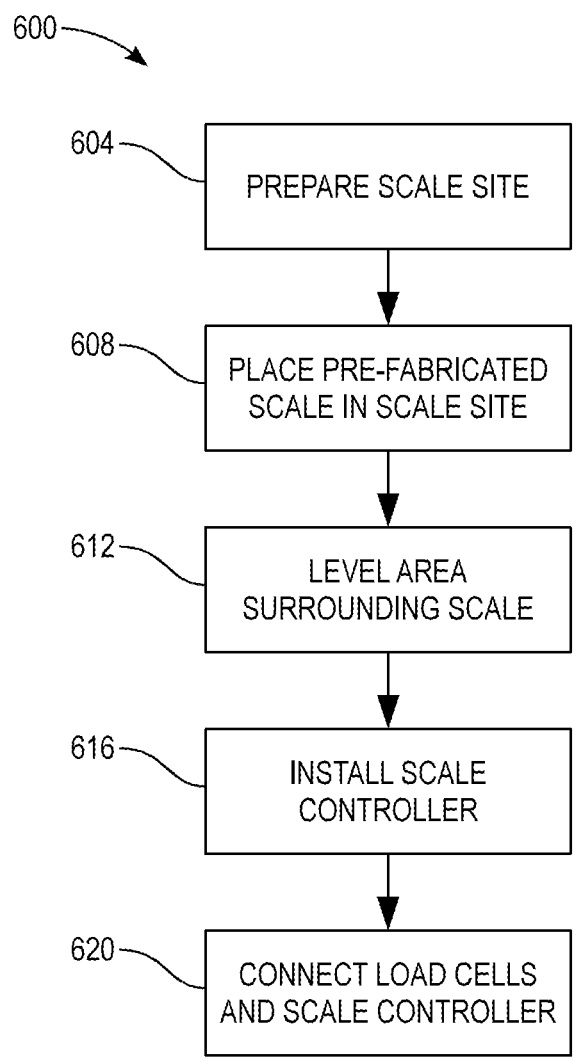
FIG. 16 is a process diagram of a method of installing a prefabricated axle scale.

A process diagram of a method 600 of installing a weighing system is depicted in FIG. 16. The process begins with the preparation of a scale site (block 604). In one embodiment, the site includes a flat approach at least twice the length of the vehicles that will be weighed by the weighing system, though other embodiments include an approach that is longer or shorter than two vehicle lengths.

The preparation of the scale site additionally includes excavating a location in which to install the scale and laying two layers of stone compacted flat and leveled.

After preparation of the site, the pre-fabricated weighing system is lowered into the excavated site (block 608). The area surrounding the weighing system is then leveled to the same height as the weighing system (block 612). In some embodiments, a concrete approach is cast on either side of the weighing system, while in other embodiments a gravel, dirt, or asphalt approach is used.

The scale controller is then installed proximate to the scale site (block 616). The scale controller is connected to the load cells (block 620) and a power source. The power source in some embodiments includes one or more of a wired power connection, a battery, and a solar cell. In one embodiment, the weighing system includes a conduit extending through the weighing system to route the cables from the load cells for connection to the scale controller.

The pre-fabricated weighing system is further configured such that the weighing system is semi-portable. The weighing system is removed by disconnecting the controller from the load cells and excavating the area surrounding the scale. The weighing system is then removed from the site and can be transported to another desired site for installation.

Figure 17:
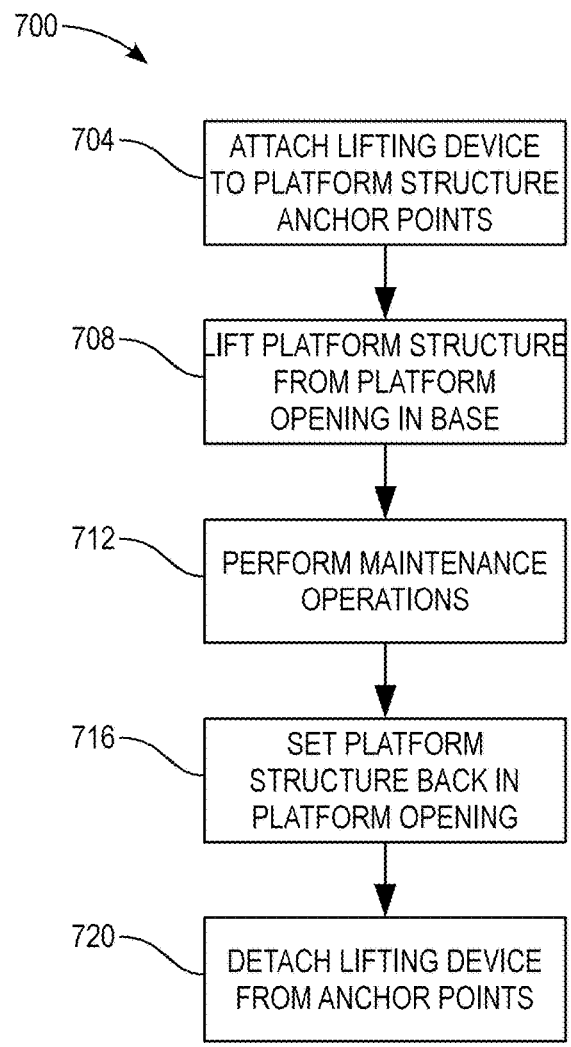
FIG. 17 is a process diagram of a method of performing a maintenance operation on an axle scale.

FIG. 17 illustrates a method 700 for maintaining a weighing system. A lifting device, for example a forklift, a backhoe, or a crane, is attached to anchor points on a platform structure of the weighing apparatus (block 704). In some embodiments, a quick-disconnect cable connecting the load cells to the controller is disconnected from within, for example, an opening located in the center of the platform structure. The platform structure is then lifted out of a platform opening in the base (block 708). The weighing system is configured such that the platform structure merely rests in the base, and is not positively attached to the base. As such, the only force the lifting apparatus must overcome to remove the platform structure is the weight of the platform structure and any attached components. Furthermore, the load cells of the weighing system are positively attached only to the platform structure, and are configured only to rest on the base. Thus, the load cells need not be decoupled from the base or the platform structure before removal of the platform structure.

Once the platform structure has been removed from the platform opening, any desired maintenance operations are performed in the platform opening (block 712). In some embodiments, the maintenance operations include removal of dirt and debris accumulated underneath the platform structure during normal operation of the weighing apparatus. The platform structure is then lowered back into the platform opening (block 716). Advantageously, since the load cells are not positively connected to the base, no additional attachment of the load cells, with the exception of reconnecting the quick-disconnect cable, is necessary to reinstall the platform structure and the load cells need not be recalibrated after reinstallation of the platform structure. The lifting device is then detached from the anchor points of the platform structure (block 720) and the maintenance process is complete.

Although the disclosed weighing system is described with reference to an axle scale for a vehicle, the reader should appreciate that the scale described herein can also be used for weighing other types of loads. For example, the scale is suitable for weighing moving objects on a manufacturing conveyor system or on an assembly line.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

The invention claimed is:

1. A weighing system, comprising:
   a base;
   a platform structure movable with respect to the base and including a planar top surface defining a horizontal plane;
   at least one flexure fixedly attached to the platform and the base, the at least one flexure configured to inhibit movement of the platform structure along the horizontal plane relative to the base; and
   a plurality of load cell assemblies, each of the plurality of load cell assemblies including an upper portion pivotably supported by the base through a first pivot assembly and a lower portion pivotably supporting the platform structure through a second pivot assembly, each of the plurality of load cell assemblies positioned such that when the upper portion of each of the plurality of load cell assemblies is projected onto the plane and the planar top surface is projected onto the plane, each of the projected upper portions is located outwardly of the projected planar top surface, wherein an axis of rotation of the first pivot assembly is parallel to an axis of rotation of the second pivot assembly.

2. The weighing system of claim 1, wherein:
   the platform structure includes a frame with a first beam; and
   the at least one flexure is fixedly attached to the first beam.

3. The weighing system of claim 2, wherein:
   the frame includes a second beam spaced apart from the first beam; and
   the at least one flexure is fixedly attached to the second beam.

4. The weighing system of claim 3, wherein:
   the platform includes at least one flexure opening;
   the at least one flexure is fixedly attached to the base by at least one bolt; and
   the at least one bolt is accessible through the planar top surface through the at least one flexure opening.

5. The weighing system of claim 4, wherein the at least one flexure comprises a plurality of flexures.

6. The weighing system of claim 5, wherein each of the plurality of flexures is positioned such that as a vehicle passes over the platform structure during a weighing operation, each of a plurality of wheels of the vehicle passes directly above a respective one of the plurality of flexures.

7. A method of providing a weighing apparatus comprising:
   forming a base having a scale opening, and a plurality of load cell openings opening laterally to the scale opening;
   providing a support member pair for each of the load cell openings;
   forming a platform structure;
   pivotably mounting a lower portion of each of a plurality of load cell assemblies to the platform structure through a first pivot assembly;
   fixedly connecting at least one flexure to the platform structure;
   supporting an upper portion of each of a plurality of load cell assemblies with a respective one of the support member pairs through a second pivot assembly, wherein an axis of rotation of the first pivot assembly is parallel to an axis of rotation of the second pivot assembly; and fixedly connecting the at least one flexure to the base after supporting the upper portion of each of the plurality of load cell assemblies.

8. The method of claim 7, wherein fixedly connecting at least one flexure to the platform structure comprises:

fixedly connecting the at least one flexure to a first beam of a frame of the platform structure.

9. The method of claim 8, wherein fixedly connecting at least one flexure to the platform structure further comprises:

fixedly connecting the at least one flexure to a second beam of the frame of the platform structure, the second beam spaced apart from the first beam.

10. The method of claim 9, wherein fixedly connecting the at least one flexure to the base comprises:

inserting a bolt at least partially through the at least one flexure and into a bolt hole in the base;

accessing the bolt through a top surface of the platform structure; and tightening the accessed bolt.

11. The method of claim 10, wherein fixedly connecting at least one flexure to the platform structure comprises:

positioning each of a plurality of flexures such that as a vehicle passes over the platform structure during a weighing operation, each of a plurality of wheels of the vehicle passes directly above a respective one of the plurality of flexures; and fixedly connecting each of the positioned plurality of flexures to the platform structure.

12. A method of weighing a vehicle comprising:

moving at least a portion of a vehicle onto a platform structure including a planar top surface defining a horizontal plane by movement of a portion of the vehicle past at least two of a plurality of load cell assemblies and then onto a platform structure, wherein the platform structure is supported by a plurality of load cell assemblies through a plurality of first load transfer areas, and each of the plurality of load cell assemblies is supported by a base through a respective one of a plurality of first load transfer areas, each of the first load transfer areas located farther from the horizontal plane than each of the second load transfer areas;

inhibiting movement of the platform structure along the horizontal plane using at least one flexure fixedly attached to the platform structure and the base;

forcing each of the second load transfer areas from a neutral position directly away from the horizontal plane by moving the at least a portion of the vehicle onto the platform structure; and determining a weight based upon signals generated by the plurality of load cell assemblies.

13. The method of claim 12, wherein inhibiting movement of the platform structure along the horizontal plane comprises:

inhibiting movement of the platform structure along the horizontal plane using at least one flexure fixedly attached a first beam of a frame of the platform structure.

14. The method of claim 13, wherein inhibiting movement of the platform structure along the horizontal plane further comprises:

inhibiting movement of the platform structure along the horizontal plane using at least one flexure fixedly attached to a second beam of the frame of the platform structure, the second beam spaced apart from the first beam.

15. The method of claim 14, wherein moving at least a portion of a vehicle onto a platform structure comprises:

moving each of a plurality of wheels of the vehicle directly above a respective one of the plurality of flexures.

16. The weighing system of claim 3, wherein the at least one flexure is fixedly attached to the base at a location which, when projected onto the plane, is located between the first beam and the second beam when the first beam and the second beam are projected onto the plane.

17. The weighing system of claim 16, wherein the at least one flexure is planar.

18. The weighing system of claim 3, wherein:

the first beam is supported by a first of the plurality of load cell assemblies on a first side of the first beam;

the at least one flexure extends between a second side of the first beam and a third side of the second beam, the second side opposite to the first side; and the second beam is supported by a second of the plurality of load cell assemblies on a fourth side of the second beam, the fourth side opposite to the third side.

* * * * *